United States Patent
Mühlberger et al.

(10) Patent No.: US 6,650,994 B2
(45) Date of Patent: Nov. 18, 2003

(54) METHOD FOR ASSESSING THE PHASE ANGLE OF A CAMSHAFT OF AN INTERNAL COMBUSTION ENGINE, IN PARTICULAR FOR A MOTOR VEHICLE

(75) Inventors: Stefan Mühlberger, Mainz (DE); Ralf Koch, Usingen (DE); Christoph Steimel, Mainz (DE)

(73) Assignee: Mannesmann VDO AG, Frankfurt (DE)

( * ) Notice: Subject to any disclaimer, the term of this patent is extended or adjusted under 35 U.S.C. 154(b) by 103 days.

(21) Appl. No.: 09/877,728

(22) Filed: Jun. 8, 2001

(65) Prior Publication Data
US 2002/0095978 A1 Jul. 25, 2002

(30) Foreign Application Priority Data
Jun. 16, 2000 (DE) .......................................... 100 28 995

(51) Int. Cl.$^7$ ........................... F02D 41/00; G06F 19/00
(52) U.S. Cl. ..................................... 701/114; 123/90.17
(58) Field of Search .................................. 701/114, 110, 701/115, 102; 123/90.15, 90.17, 90.11, 90.31; 73/116, 117.3

(56) References Cited

U.S. PATENT DOCUMENTS

| 5,140,955 A | | 8/1992 | Sono et al. ............... 123/90.15 |
| 5,245,968 A | * | 9/1993 | Kolias et al. ............... 123/480 |
| 6,119,641 A | * | 9/2000 | Koch et al. ............... 123/90.17 |

FOREIGN PATENT DOCUMENTS

| DE | 3911554 | 10/1990 |
| DE | 4395833 | 7/1997 |
| DE | 19612179 | 8/1997 |
| DE | 19627796 | 1/1998 |
| DE | 19917772 | 10/2000 |
| EP | 0483192 | 5/1992 |
| EP | 0907014 | 4/1999 |

* cited by examiner

Primary Examiner—Hieu T. Vo
(74) Attorney, Agent, or Firm—Martin A. Farber

(57) ABSTRACT

A method for check the phase adjustment of a camshaft, in which the present phase angle of a variable phase camshaft can be detected reliably. A first value which corresponds to the actual noise level of the internal combustion engine is determined during a predetermined evaluation window and is compared with a second value, which corresponds to the actual noise level after phase adjustment of the camshaft, with the operation of the phase adjustment of the camshaft being assessed as a function of this comparison.

10 Claims, 4 Drawing Sheets

METHOD FOR ASSESSING THE PHASE ANGLE OF A CAMSHAFT OF AN INTERNAL COMBUSTION ENGINE, IN PARTICULAR FOR A MOTOR VEHICLE

FIELD AND BACKGROUND OF THE INVENTION

The invention relates to a method for assessment of the phase angle of a camshaft of an internal combustion engine, in particular for a motor vehicle.

In internal combustion engines which are used in motor vehicles, the mixture is supplied to the individual cylinders of the internal combustion engine via inlet valves which are operated by the camshaft. Internal combustion engines exist, in which the inlet control times can be set such that they are variable. This is achieved by using variable phase camshafts. With these camshafts, the camshaft is displaced relative to the driving pinion. If the present setting is detected by means of a camshaft sensor fitted on the drive pinion, this does not allow the phase adjustment to be monitored at the same time, so that the phase adjustment thus cannot be determined reliably.

SUMMARY OF THE INVENTION

The invention is thus based on the object of specifying a method for checking the phase adjustment of a camshaft, during which check the present phase angle of a variable phase camshaft can be detected reliably.

According to the invention, the object is achieved in that a first value which corresponds to the actual noise level of the internal combustion engine is determined during a predetermined evaluation window, is compared with a second value which corresponds to the actual noise level after phase adjustment of the camshaft, and the operation of the phase adjustment of the camshaft is assessed as a function of this comparison.

The advantage of the invention is that the phase angle and adjustment of the camshaft are detected solely by an indirect measurement of the noise level of the internal combustion engine. This makes use of the fact that the inlet valves arranged on the individual cylinders of the internal combustion engine produce closing noises which can be measured well. These noise peaks are detected and are used to determine the camshaft phase angle.

The correct operation of the phase adjustment of a variable phase camshaft is determined reliably in that the first value, which corresponds to the actual noise level, is determined during the first evaluation window for a first setting of the variable phase camshaft, and a second value, which corresponds to the actual noise level, is then determined for a second setting of the variable phase camshaft, with the noise level values determined for the two settings being formed into a ratio of one to the other in order to assess the phase adjustment of the camshaft.

The ratio formation eliminates the basic noise of the internal combustion engine.

The position and length of the evaluation window are chosen such that at least one closing noise of the inlet valves operated by the camshaft is detected at the first setting of the camshaft within the evaluation window, and the closing noise of the inlet valves can no longer be detected in the evaluation window at the second setting of the camshaft.

In a development of the invention, a third value of the noise level for the first selected setting of the camshaft and a fourth value of the noise level for the second selected setting of the camshaft are determined during a second predetermined evaluation window which preferably follows the first predetermined evaluation window in time, with the third and the fourth noise level values being formed into a ratio of one to the other.

The use of a second evaluation window improves the reliability of diagnosis of the phase adjustment of the camshaft. In addition, in the event of a fault (no phase adjustment), the actual phase angle of the camshaft is identified using the second evaluation window.

Advantageously, the ratio of the first value to the second value of the noise level and/or the ratio of the third value and the fourth value of the noise level are each compared with a reference value, and, if the reference value is exceeded, correct twisting of the camshaft is identified.

In a development, the first and/or the second evaluation window are/is set as a function of the angle position of a crankshaft, by which means the measurement window can be reproduced at any time.

In a refinement, a number of values which are measured for one setting of the camshaft and correspond to the actual noise load are averaged, and this mean value is used as the basis for assessing the phase adjustment of the camshaft.

A structure-borne sound sensor, which is arranged on the internal combustion engine for antiknock control, is used to assess the camshaft adjustment, with the predetermined evaluation windows for determining the camshaft adjustment being opened only when other measurement operations, which are dependent on the signal from the structure-borne sound sensor, are inactive. In this way, the time period for determining the camshaft position differs, for example, from the time period of ignition adjustment.

The invention allows numerous embodiments. One of these will be explained in more detail with reference to the figures which are illustrated in the drawing, in which:

DETAILED DESCRIPTION OF THE PREFERRED EMBODIMENT

Identical features are denoted by the same reference symbols.

Figure 1:
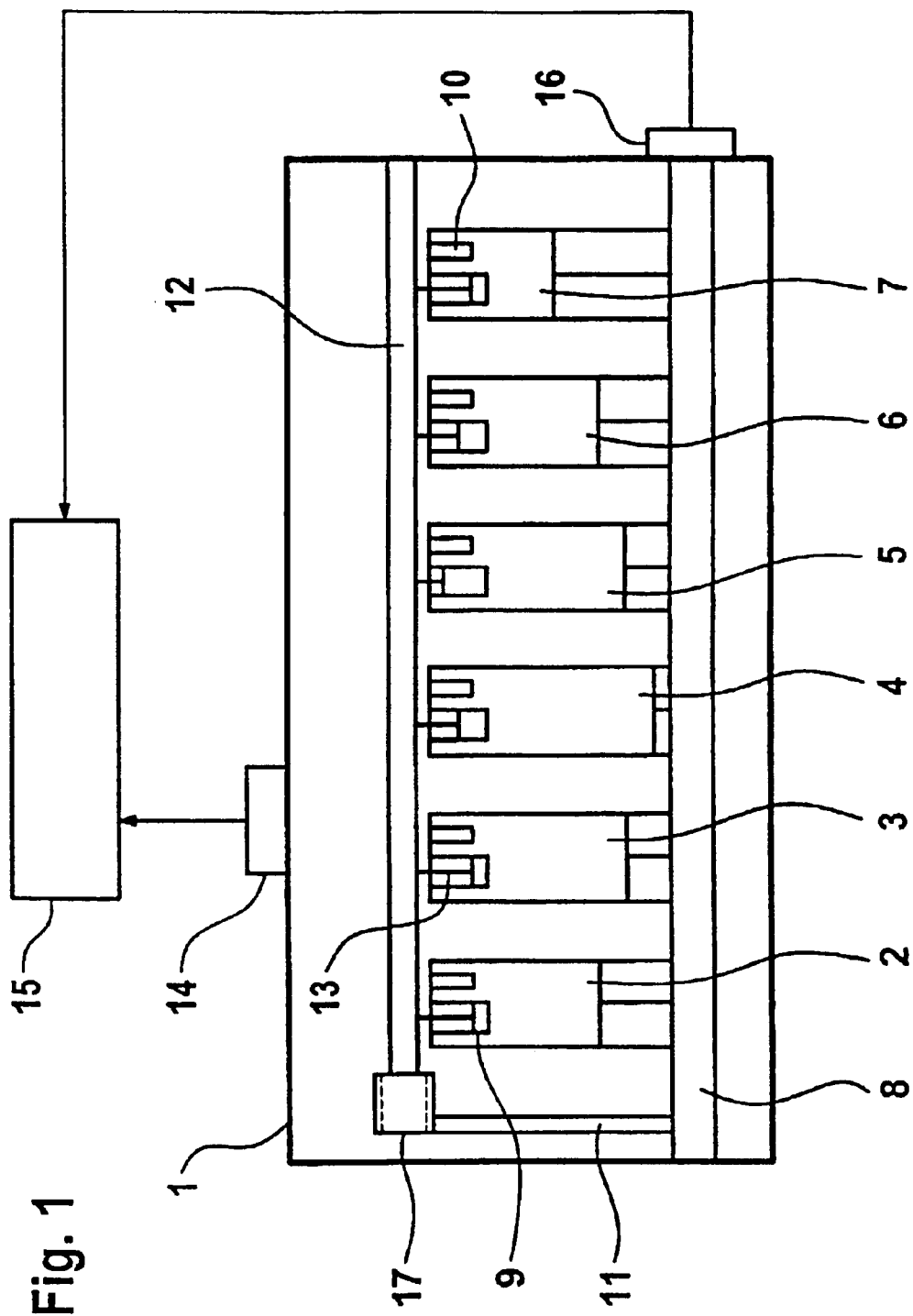
FIG. 1 shows an arrangement for carrying out the method according to the invention.

FIG. 1 shows, schematically, an internal combustion engine 1 for motor vehicles. The internal combustion engine 1 is in the form of a 6-cylinder in-line four-stroke engine. The 6 cylinders 2, 3, 4, 5, 6, 7 drive a crankshaft 8. Each cylinder 2, 3, 4, 5, 6, 7 has an inlet valve 9 for mixture supply, and an outlet valve 10 for emission of the combustion products.

The crankshaft 8 is connected via a drive 11 to the camshaft 12, which controls the opening and closing times of the inlet valves 9 of the engine 1.

Each inlet valve 9 has a tappet 13, which is operated by the camshaft 12. The camshaft 12 in this case determines the travel of the tappet 13, and thus the opening and closing of the inlet valve 9.

A structure-borne sound sensor 14 is arranged on the housing of the internal combustion engine 1 itself, and is connected to a structure-borne sound evaluation unit that is linked to the engine control electronics 15.

Furthermore, the setting of the crankshaft 8 is determined by a crankshaft sensor 16, which is likewise connected to the engine control electronics 15.

Figure 2:
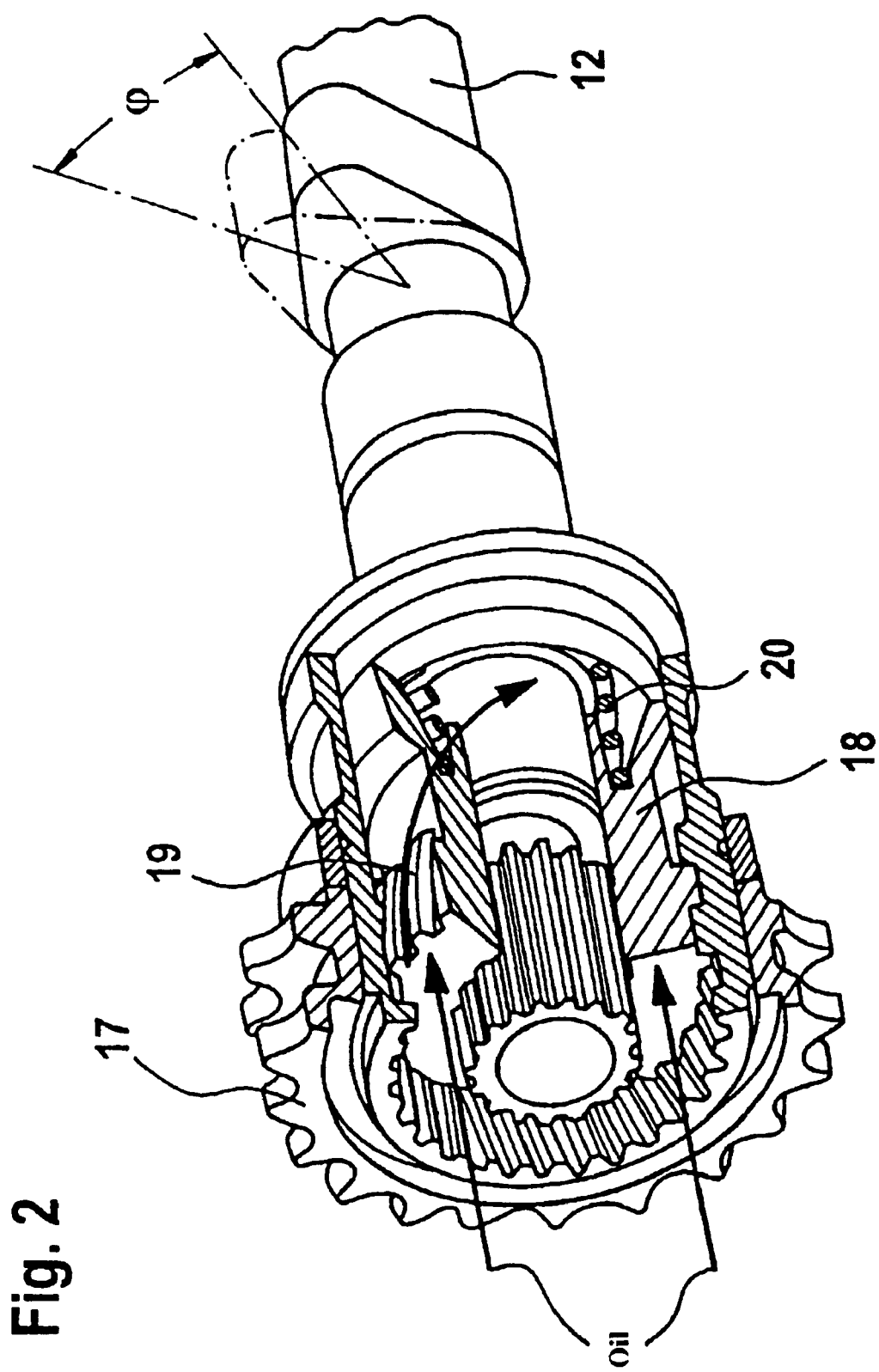
FIG. 2 shows a camshaft adjuster.

In internal combustion engines with a variable valve drive, a camshaft adjuster, as shown in FIG. 2, is used to influence the inlet control times of the inlet valves 9. The drive wheel 17 of the drive 11 which connects the crankshaft 8 to the camshaft 12 is in this case not connected to the camshaft 12 in a fixed position. The phase adjustment of the camshaft 12 with respect to the crankshaft 8 is carried out via a piston 18 to which oil pressure is applied. An oblique tooth system 19 on the piston 18 and drive wheel 17 converts the axial movement of the piston 18 with respect to a resetting spring 19 into twisting of the piston 18 and drive wheel 17. The control oil required for the twisting process is supplied via the camshaft 12 itself, which has a hollow bore. This allows twist angles $\phi$ of 0-30° crank angle (° KW) to be achieved.

Figure 3:
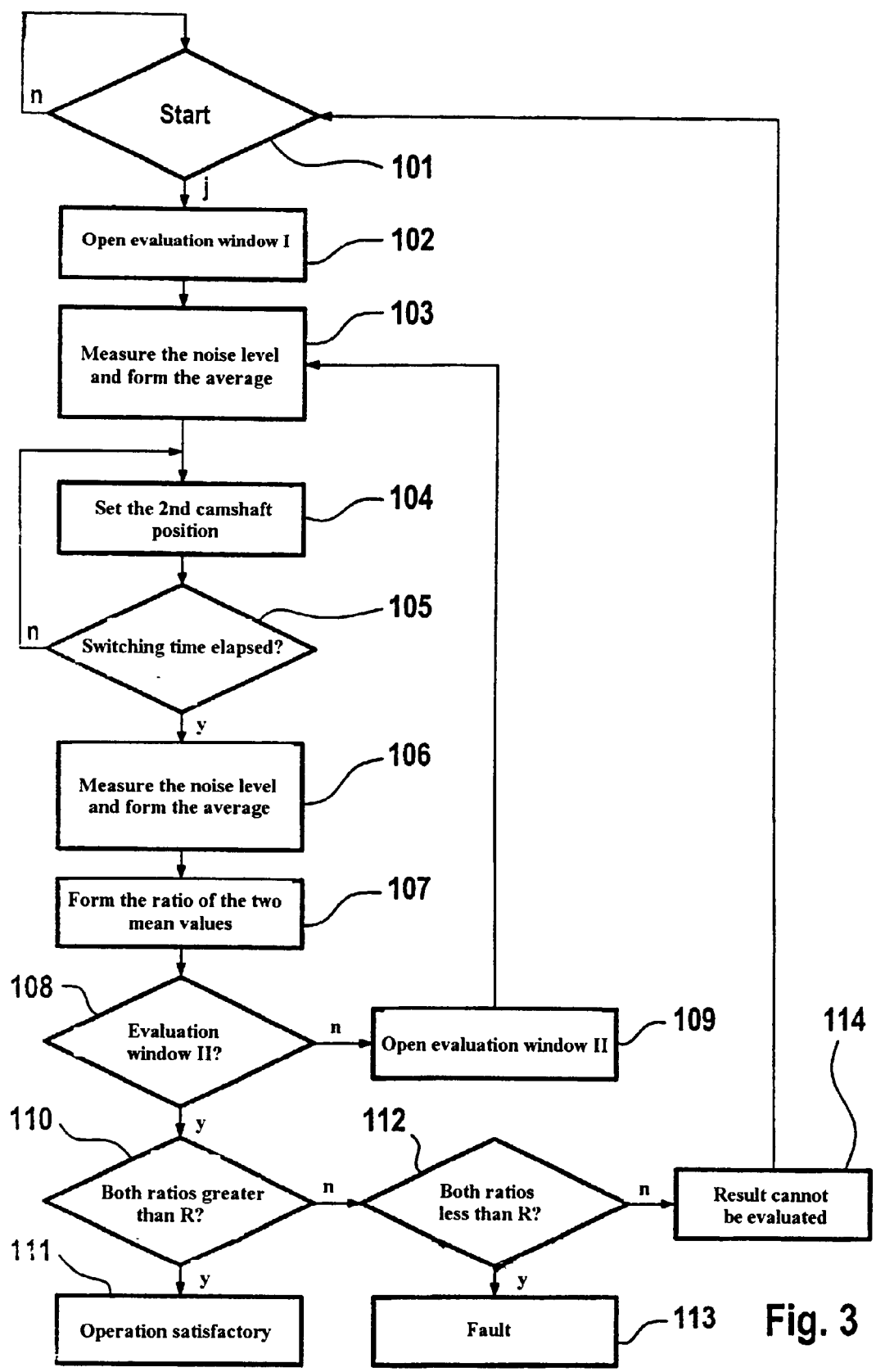
FIG. 3 shows a flowchart for the method according to the invention.

The method according to the invention will be explained with reference to FIG. 3.

After the start of the program (step 1), the structure-borne sound evaluation unit 15 opens a first evaluation window I in step 2. A mean value M1 is formed (step 3) from the signals supplied from the structure-borne sound sensor 14 for the first position setting of the camshaft 12. The camshaft 12 is then rotated to a second phase angle in step 4. Once a predetermined time of, for example, 0.5 s has elapsed for stabilization of the noise conditions (step 5), a mean value M2 is determined (step 6) for this second position of the camshaft from the signals from the structure-borne sound sensor 14. The mean values M1, M2 determined in this way are then formed into a ratio of one to the other (Step 7).

A check is carried out in step 8 to determine whether a second evaluation window II is active. If this is not the case, the second evaluation window II is called in step 9.

After activation of the second evaluation window II, steps 3 to 7 are carried out and, in the process, the mean values M3 and M4 which correspond to the two camshaft phase angles are determined, and are likewise formed into a ratio of one to the other.

Once the second time window II has elapsed, the ratios M1/M2 and M3/M4 are compared with a threshold value R (step 10). If both ratios are greater than a predetermined threshold value R, the camshaft adjustment is satisfactory (step 11). If they are below the threshold value R (step 12), a malfunction of the phase adjustment is identified (step 13). If the ratio values cannot be associated, the result is rejected (step 14) and a new measurement is started.

Figure 4:
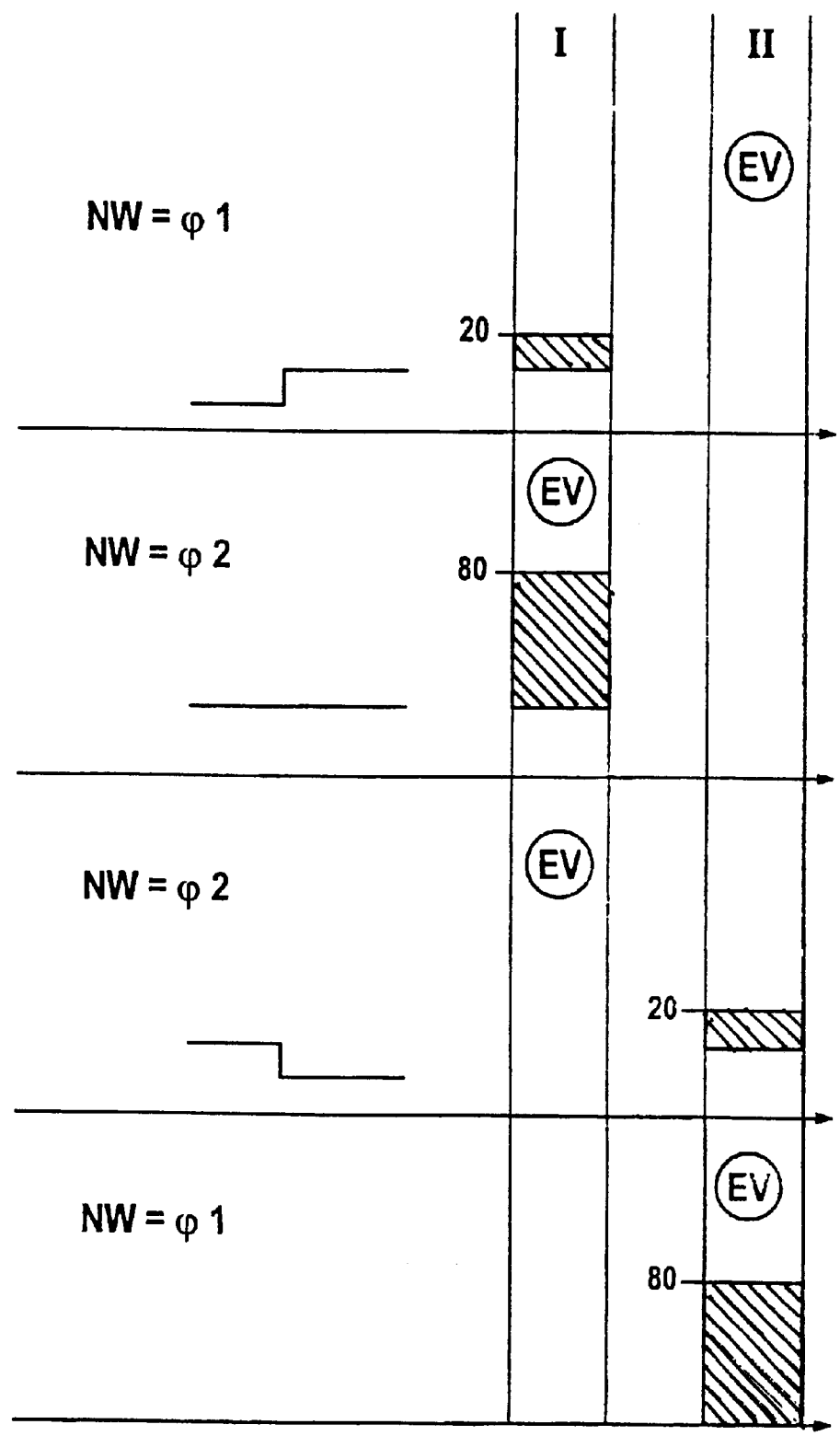
FIG. 4 shows an illustration of the evaluation windows.

FIG. 4 will be used to explain the setting of the evaluation windows I, II in conjunction with the measured noise levels.

The evaluation windows I and II are set permanently as a function of the crank angle ° KW. In the case of the chosen 6-cylinder engine, the ignition separation is 120° KW, that is to say three ignitions take place per revolution of the engine (360° KW). When ignition has taken place once in all 6 of the illustrated cylinders, the crankshaft 8-has rotated twice (720° KW).

The window start of the first evaluation window I relates to x° crank angle KW with respect to the top dead center ZOT of a cylinder. The window length is y° KW.

The window start of the second evaluation window is z° KW>x° KW+y° KW. The window length is likewise y° KW.

The evaluation windows I, II are in this case set as a function of the top dead center of a cylinder such that the closing noise caused by the inlet valve is either in the evaluation window or undoubtedly outside the evaluation window depending on the camshaft phase angle.

If the twist of the camshaft 12 corresponds to the late position ($\phi1=0°$ KW), the closing noise is outside the first evaluation window I. A mean noise level value is measured, which corresponds to the basic noise of the internal combustion engine 1.

After changing the twist of the camshaft to the early position ($\phi2=30°$ KW), the closing noise of the injection valves 9 occurs in the first evaluation window I, and a considerably higher mean noise level value is detected.

During the second evaluation window II, the closing noise of the injection valves 9 is not detected for the early camshaft setting ($\phi2=30°$ KW). The general mean noise level value is once again the same as the basic noise level.

After setting the late camshaft position ($\phi1=0°$), the closing noise of the injection valves 9 occurs in the evaluation window II, and a considerably higher mean noise level value is once again detected.

The values determined in accordance with the method shown in FIG. 2 are formed into a ratio of one to the other, and a plausibility check is used to decide whether the phase adjustment of the camshaft is or is not correct.

The method according to the invention is not restricted to two time windows and two camshaft adjustment positions. Depending on the application, these can be varied as required. The critical factor for the invention is that the noise sensors can be used to reliably determine the camshaft adjustment. It is also feasible for methods according to the invention to be used for checking of cylinder deactivation, for functional testing of electromechanical valve operation, and fully variable valve drive.

What is claimed is:

1. A method for testing phase adjustment of a camshaft in an internal combustion engine, in particular for a motor vehicle, comprising the steps of:

determining a first value (M1) corresponding to an actual noise level of the internal combustion engine (1) during a predetermined evaluation window (I);

comparing said first value with a second value (M2) corresponding to the actual noise level after the phase adjustment of the camshaft (12); and assessing the operation of the phase adjustment of the camshaft (12) as a function of said comparison.

2. The method as claimed in claim 1, wherein said step of determining a first value is determined during the first evaluation window (I) for a first setting ($\phi2$) of a variable phase camshaft (12), and further comprising the steps of:

determining the second value (M2), corresponding to the actual noise level for a second setting ($\phi2$) of the variable phase camshaft (12); and forming noise level values (M1, M2) determined for the two settings ($\phi1$, $\phi2$) into a ratio (M1/M2) of one to another in order to assess the phase adjustment of the camshaft (12).

3. The method as claimed in claim 2, further comprising the step of choosing position and length of the predetermined evaluation window (I) such that at least one closing noise of injection valves (9) operated by the camshaft (12) is detected within the evaluation window (I) at the first setting ($\phi2$) of the camshaft (12).

4. The method as claimed in claim 2, further comprising the step of choosing position and length of the evaluation window (I) such that a closing noise of injection valves (9)

is not detected in the evaluation window (I) at the second setting ($\phi 2$) of the camshaft (12).

5. The method as claimed in claim 1, further comprising the steps of:

determining a third value (M3) of the noise level for the first selected setting ($\phi 1$) of the camshaft (12) and a fourth value (M4) of the noise level for the second selected setting ($\phi 2$) of the camshaft (12) during a second predetermined evaluation window (II) which preferably follows the first predetermined evaluation window (I) in time; and forming the third noise level value and the fourth noise level value into a ratio (M3/M4) of one to another.

6. The method as claimed in claim 5, further comprising the step of comparing a ratio (M1/M2) of a first value to a second value of the noise level and/or the ratio (M3/M4) of the third value to the fourth value of the noise level with a reference value (R), and, if the reference value (R) is exceeded, identifying operation of the phase adjustment of the camshaft (12) as correct.

7. The method as claimed in claim 1, furthering comprising the step of determining the first predetermined evaluation window (I) and/or a second predetermined evaluation window (II) as a function of angle position (KW) of a crankshaft (6).

8. The method as claimed in claim 1, further comprising the step of averaging a number of values which are measured for one setting ($\phi 1$; $\phi 2$) of the camshaft (12) and correspond to an actual noise load and using a mean value as a basis for assessing the phase adjustment of the camshaft (9).

9. The method as claimed in claim 1, further comprising the step of using a structure-borne sound sensor (14), which is arranged on the engine (1) for anti-knock control, to assess the camshaft adjustment, and choosing predetermined evaluation windows (I, II) for determining a camshaft twist such that they are opened only when other operations, which are dependent on a signal from the structure-borne sound sensor, are inactive.

10. The method as claimed in claim 2, further comprising the step of comparing the ratio (M1/M2) of the first value to the second value of the noise level and/or a ratio (M3/M4) of a third value to a fourth value of the noise level with a reference value (R), and, if the reference value (R) is exceeded, identifying operation of the phase adjustment of the camshaft (12) as correct.

* * * * *